United States Patent Office 3,682,592
Patented Aug. 8, 1972

3,682,592
TREATMENT OF WASTE HCl PICKLE LIQUOR
Geza L. Kovacs, La Grange, Va., assignor to
Pori, Inc., Baltimore, Md.
No Drawing. Continuation-in-part of application Ser. No. 791,191, Jan. 14, 1969. This application July 20, 1970, Ser. No. 56,639
Int. Cl. C01b 7/08; C01g 49/06
U.S. Cl. 423—488
7 Claims

ABSTRACT OF THE DISCLOSURE

This invention is directed to the oxidation of ferrous chloride in liquid aqueous solution, such as waste HCl pickle liquor, to a solution containing ferric chloride by intimately intermingling said ferrous chloride solution with free oxygen (1) in the presence of a dissolved promoter cation selected from the class of ammonium, chromium, cobalt, copper, manganese, nickel, zinc or mixtures thereof at an elevated temperature or (2) in the absence of promoter, at superatmospheric pressure and at a temperature of at least about 175° F., for a time sufficient to obtain a ferric chloride containing solution. A mixture of ammonium ions and cupric ions is the preferred promoter.

The invention is also directed to producing hydrochloric acid from the ferric chloride solution obtained by the aforesaid oxidation process by the solution at a temperature of about 250-400° F. to obtain a HCl gas-water vapor overhead and a bottoms aqueous slurry of iron oxide.

CROSS-REFERENCE TO RELATED APPLICATION

This a continuation-in-part application arising out of my co-pending application Ser. No. 791,191, filed Jan. 14, 1969, entitled: Production of Hydrochloric Acid From Waste HCl Pickle Liquor, now abandoned.

BACKGROUND OF THE INVENTION

(1) Field of the invention

This invention relates to the oxidation of liquid aqueous ferrous chloride solution to obtain a liquid aqueous ferric chloride solution, preferably utilizing a promoter cation or combinations as oxidation promoter. Particularly the invention relates to the recovery of the chlorine content of waste hydrochloric acid (HCl) steel mill pickle liquor—WPL—as hydrochloric acid.

(2) Description of the prior art

Hydrochloric acid is used to pickle steel to remove the oxide coating from the base metal. Acid of 20-30% concentration is generally used as makeup for the picklers, with a preference for the higher strength acids. The pickling operation produces a waste material known a "waste HCl pickle liquor" and more commonly spoken of as "WPL." Typically WPL contains in addition to water, about 18-25 weight percent of ferrous chloride ($FeCl_2$), less than 1 wt. percent of ferric chloride ($FeCl_3$), variable but small amounts of free HCl, and small amounts of organic inhibitors which decrease, the attack of the acid on the base metal.

WPL is an acidic material and its disposal when environmental pollution is to be avoided is a serious economic problem. Commonly the WPL is neutralized with lime; the slurry dewatered; and the solid used as land fill. It can be seen that this is an expensive operation, even when a dumping area is readily available.

Hydrochloric acid is relatively expensive and recovery of the chlorine content of the WPL, as hydrochloric acid, has been a goal of picklers from the beginning of the extensive use of hydrochloric acid as a pickling acid. The processes offered commercially today all involve thermal decomposition of the WPL and recovery of the HCl gas content of the gaseous decomposition products by water scrubbing. Illustrative of a recently developed process now being offered is: WPL is sprayed through a burner area onto a bed of refractory material, where it decomposes into HCl gas and iron oxide. The iron oxide particles are periodically removed by probing and vibrating the bed. The gases are scrubbed to recover 20° Bé. acid. The system is closed-loop to assure minimum environmental contamination (C&E News, p. 32, May 18, 1970).

Needless to say, the roasting processes—the only ones now being offered—are very expensive, both in investment costs and in direct operating costs.

The concentration on roasting processes for treatment of WPL is the result of the lack of success of the art in oxidizing ferrous chloride in aqueous solution to ferric chloride. Crummett et al., U.S. Pat. No. 2,677,598, issued May 4, 1954, demonstrates that liquid aqueous ferrous chloride solutions when contacted with free oxygen produce the ferric chloride only to a slight extent; also that the presence of hydrochloric acid retards the reaction. Crummett provides a process involving the addition of hydrochloric acid to the aqueous ferrous chloride solution to a 3-5 N range; then oxidizing the HCl-$FeCl_2$ solution in the presence of a large amount of the chloride salt of an anion exchange resin—a preformed salt.

Crummett et al. postulate that an equilibrium exists in aqueous solution essentially favoring only the ferrous ion. They discovered that the ferric chloride was chemisorbed from aqueous solution by the solid salt of an anion exchange resin and HCl; thus the equilibrium was shifted enough to permit substantial conversion of the ferrous ion to ferric ion. The chemisorbed ferric chloride and hydrogen chloride is desorbed with water, or preferably with dilute hydrochloric to obtain a solution of ferric chloride containing large amount of dissolved HCl.

Hudson U.S. Pat. No. 2,428,221, issued Sept. 30, 1947 shows air treating of WPL which has been fortified with added hydrochloric acid to convert the ferrous ion to ferric ion. Enough HCl is added to obtain a stoichiometric reaction between ferrous chloride and HCl; the free oxygen reacts with the freed hydrogen to form water. Hudson himself points out the economic disadvantages of this operation.

SUMMARY OF THE INVENTION

The invention is directed to two processes for producing ferric chloride from ferrous chloride by oxidation in liquid aqueous solution and to a combination process wherein the thus obtained aqueous solution containing ferric chloride is thermally decomposed to obtain hydrogen chloride gas, which is recovered as hydrochloric acid.

The oxidation process involves oxidation of liquid aqueous ferrous chloride solution, in the absence of an oxidation promoter; however, such a promoter may be present. Or the oxidation is carried out in the presence of a hereinafter defined oxidation promoter cation or preferably in the presence of promoter ammonium ion and a defined metal ion.

(1) The Promoted Oxidation Process: In this process a liquid aqueous solution of ferrous chloride, preferably waste HCl pickle liquor or solution derived from waste HCl pickle liquor, is intimately intermingled with free oxygen which may be oxygen gas or air, said ferrous chloride solution containing at least an oxidation-promotional amount of dissolved cations selected from the class consisting of ammonium, chromium, cobalt, copper, manganese, nickel, zinc and mixtures thereof, at an elevated temperature, desirably between about 120-500° F., for a time to obtain a liquid aqueous solution containing dissolved ferric chloride and dissolved promoter cations. Preferably the oxidation is carried out at superatmospheric pressure and at a temperature between about 200–350° F. The preferred promoter cations, when only one is used, are ammonium, cupric and chromic. It is especially preferred to use a dual promoter system of ammonium ion and one of the metal ions, particularly copper and cupric ion specifically. 0.1–6 weight parts of promoter ion affording compound per 100 weight parts of ferrous chloride solution charged is a preferred usage of promoter. An especially preferred embodiment utilized 3 weight parts of ammonium chloride and 1 weight part of cupric chloride per 100 weight parts of ferrous chloride solution.

(2) The "No Promoter Present" oxidation process: Quotation marks are used about No Promoter Present because this process may be operated without promoter present or promoter, as defined in the aforesaid Promoted Process, may be present; the presence of promoter increases the oxidation rate and may permit reaching a higher level of ferric ion content in the product solution.

This No Promoter Present Process differs from the Promoted Process in two essential conditions, namely, (a) it operates at superatmospheric pressure and (b) it operates at an elevated temperature of at least 175° F. Desirably the superatmospheric pressure is at least about 30 p.s.i.g. and preferably is at least about 100 p.s.i.g. Especially when the ferrous chloride solution charged is WPL or is derived from WPL, it is preferred to operate at a superatmospheric pressure between about 100 and 200 p.s.i.g. and at a temperature between about 300 and 400° F.

As in the Promoted Process, the instant oxidation process is continued for a time sufficient to obtain a liquid aqueous solution containing dissolved ferric chloride (and dissolved promoter ions if a promoter is present).

(3) The combination process for producing hydrochloric acid from waste HCl pickle liquor: In this combination process a liquid aqueous ferric chloride solution is obtained in step I by oxidation of WPL or solution derived from WPL according to either the Promoted Process or the No Promoter Process, as hereinbefore described.

The said liquid aqueous ferric chloride solution is heated at a temperature of about 250–400° F.; taking overhead a stream of HCl gas and water vapor; and obtaining in the decomposition zone an aqueous slurry of iron oxide. Hydrochloric acid is recovered from the overhead stream by conventional procedures. It is preferred to carry out the ferric chloride decomposition under sub-atmospheric pressure, either vacuum or the condition obtained by injecting hot gas into the liquid solution, preferably by means of a submerged combustion burner. The defined "sub-atmospheric" pressure decomposition permits operation at the lower temperatures of those given above. For example, excellent decomposition rates are obtained using hot submerged combustion gases and a decomposition zone temperature on the order of 250° F.

The manner of carrying out the decomposition and of handling the overhead HCl-water vapor stream determine the concentration of the hydrochloric acid recovered; acid of 17–33% has been obtained; higher concentrations can be obtained if desired.

(4) The decomposition of ferric chloride process: Hydrochloric acid is produced from liquid aqueous solution of ferric chloride by heating the solution at a temperature of about 250–400° F., at subatmospheric pressure, preferably by means of hot submerged gases, to produce an overhead stream of HCl gas and water vapor, and an aqueous slurry of iron oxide in the bottom of the decomposition zone.

DESCRIPTION OF THE INVENTION, PREFERRED EMBODIMENTS AND EXAMPLES

The invention is directed to (I) the oxidation, using free oxygen, of ferrous chloride while in liquid aqueous solution to obtain a liquid aqueous solution containing ferric chloride and to (II) the decomposition of the ferric chloride while in liquid aqueous solution to ferric oxide and HCl gas; the HCl gas is recovered in the form of hydrochloric acid. It is possible to obtain the azeotropic composition readily; concentrations containing 30–37% HCl can be obtained in a particular embodiment of the invention.

The oxidation process

Charge to the oxidation reaction zone: The ferrous ion is oxidized to the ferric ion by reaction involving free oxygen; air is the preferred source of the oxygen. A large excess of oxygen is preferred.

The ferrous chloride is present in liquid aqueous solution. Solution concentrations may range from very dilute to saturated. It is preferred to use the more concentrated solutions. Other materials may be present, which do not interfere with the ferrous to ferric reaction.

Presently, ferrous sulfate is produced in such large amounts from the sulfuric acid pickling of steel that it is a drug-on-the-market. An aqueous solution of ferrous chloride is readily prepared by reaction of the ferrous sulfate with aqueous sodium chloride solution; sodium sulfate is obtained, which has a higher market value. The aqueous ferrous chloride produced by this reaction is a suitable charge to the oxidation process of this invention.

Waste HCl pickle liquor is a preferred aqueous ferrous chloride solution for use in the invention.

Other suitable solutions can be derived from waste HCl pickle liquor. Especially preferred are solutions which are enriched in ferrous chloride content, either by the addition of ferrous chloride to WPL or by evaporatively removing some of the water content of the WPL. For example: Good results are obtained with a solution containing about 40% ferrous chloride, obtained by evaporation of WPL containing about 20% of ferrous chloride.

It is desirable to conserve the free HCl always present to some extent in WPL; this may be stripped or boiled out of solution either during the evaporation to make concentrated waste HCl pickle liquor or during the oxidation procedure; the HCl gas passes off with the water vapor and nitrogen, when air is used, and excess oxygen. This loss is avoided, in an embodiment of the instant invention, by treating the WPL with finely divided iron oxide particles to convert the HCl content thereof to iron chloride (in the main ferric chloride).

The iron oxide treatment is beneficial with WPL charge itself and is a must when evaporatively concentrated waste HCL pickle liquor forms the charge to the oxidation reaction.

It has been discovered that finely divided iron oxide particles present as a dispersion in the liquid aqueous ferrous chloride solution have a very noticeable effect on the initial rate of the oxidation reaction. This is especially noticeable with WPL or solution derived from WPL; these solutions have an induction period during which the ferrous ion is oxidized very slowly. The induction period is believed to be caused by the inhibitors present in the HCl pickling acid. The presence of even a minor amount of finely divided iron oxide particles dispersed in the solution when the intimate intermingling of free oxygen and solution is begun, results in almost immediate starting of the oxidation reaction.

When operating with HCl containing solutions, such as WPL, it is necessary to add iron oxide in an amount sufficient to convert the HCl to iron chloride and, preferably, to provide a minor amount of finely divided iron oxide particles dispersed in the treated liquor. In the case of concentrated WPL, it is preferred to add, before the evaporation is begun, enough iron oxide particles to the fresh WPL to provide the HCl reaction amount and also the minor initial rate accelerating amount. However, the minor accelerating amount of particles may be added to the concentrated just before charging of the solution to the oxidation zone.

Intermingling and oxidizer: The oxidation rate is influenced by the intensity of intermingling (agitation) of the ferrous chloride solution and the gaseous oxidizer (free oxygen or air). Intimate intermingling such as provided by vigorous mechanical agitation, of the contents of the oxidation zone is essential for getting reasonable oxidation rates. Mere sparging of air into the solution, even at superatmospheric pressure, gives essentially no oxidation reaction.

It is preferred to introduce the free oxygen in a large excess over the theoretical requirement. However, it has been observed that at the higher temperatures and higher pressures, the oxidation rate is excellent at oxygen usage of as little as 150% of the theoretical.

Oxidation process with added promoter cations

Cation oxidation promoters: It has been discovered that certain cations dissolved in the liquid aqueous ferrous chloride solution charged to the oxidation reaction result in an increase in the rate of oxidation of the ferrous ions to ferric ions.

The dissolved cations present in the ferrous chloride solutions may be provided by any compound whose other ion(s) do not interfere with the oxidation reaction.

The dissolved cations utilized as oxidation promoter in the promoted oxidation process of the invention are provided by compounds affording in aqueous solution ammonium ion or a cation of the metals: chromium, cobalt, copper, manganese, nickel or zinc.

When using a single promoter ion, it is preferred to use either ammonium ion, or cupric ion, or chromic ion. Although the cupric ion alone, and the chromic ion alone, is somewhat more effective as a promoter, when using the same weight of the ion affording compound, the ammonium ion, and specifically the ammonium chloride compound, is, for economic reasons, the especially preferred promoter ion.

Mixtures of two or more of these cations may be used. It is preferred to use a mixture of ammonium ion and at least one of the defined metal ions; in such a mixture, the metal ion is referred to herein as "co-promoter" ion. A mixture of ammonium ions and cupric ions is especially preferred as a dual promoter. (Herein "metal ions" and "metal cations" have the same meaning.)

It is pointed out that dissolved ammonium chloride alone and dissolved cupric chloride alone permit the conversion of a major proportion, or even more than a major proportion, of the dissolved ferrous ion to ferric ion, as determined by the amount of dissolved ferric ion relative to dissolved ferrous ion remaining in solution. (Some of the ferric ion goes to form insoluble ferric oxide.) Unexpectedly the use of the ammonium and cupric ions together results, at comparable operating conditions, in essentially complete conversion of the ferrous ion to ferric ion, producing aqueous solutions containing 98% or more of the dissolved iron ions in the form of ferric ions.

Preferred ammonium ion providing compounds for use in the oxidation process are ammonium chloride, ammonium sulfate and ammonium phosphate. These are dissolved in the liquid aqueous ferrous chloride solution to afford the dissolved oxidation-promoter ammonium ions. Quaternary ammonium compounds are sources of "ammonium ions" for the purposes of this invention.

When the charge is WPL or other free HCl containing solution at least a portion of the needed ammonium ions can be obtained by reacting free ammonia ($NH_3$) with the HCl in the solution. That is a simple method of providing makeup in a large scale operation where the dissolved ammonium ions are recovered and recycled to the oxidation reaction, and makeup is needed to take care of the inevitable losses of materials.

Preferably the dissolved copper ions are provided by cupric chloride, cupric fluoride, or cupric sulfate.

Preferably the dissolved chromic ions are provided by chromic chloride or chromic sulfate.

The liquid aqueous solution of ferrous chloride charged to the oxidation reaction contains at least an oxidation-promotional amount of dissolved cations. At a given set of conditions, increasing the amount of dissolved promoter ions, up to the saturation amount, results in a beneficial effect on the rate of oxidation of the ferrous ions in the solution.

The minimum oxidation-promotional amount is dependent on factors such as temperature of the oxidation zone, the concentration of ferrous chloride in the charge solution, and the degree of conversion of ferrous ion to ferric ion desired, and on the promoter ion itself. In general, the dissolved cation affording compound is present in solution in an amount of not more than about 20 parts by weight per 100 parts by weight of liquid aqueous ferrous chloride solution charged to the oxidation reaction.

Hereinafter, the finite range amount of ammonium, copper, or chromium ion affording promoter compound present in the defined ferrous chloride solution is given for ammonium chloride, cupric chloride, or chromic sulfate as the promoter compound. It is a simple matter to convert these finite range amounts over to the particular ammonium, copper, or chromium compound actually used as the promoter.

Commonly when ammonium chloride, cupric chloride, or chromic sulfate is said compound the usage is between about 0.1 and about 6 weight parts per 100 parts by weight of charge solution. More typically the ammonium chloride, cupric chloride, or chromic sulfate usage is about 1–4 weight parts per 100 weight parts of charge solution. This latter range is of particular interest with ammonium chloride when this is being used in combination with a metal cation.

Ammonium ion promoter plus metal ion co-promoter: It has been discovered that the oxidation rate is increased by the use of a dual promoter system consisting of a mixture of ammonium ions and a metal cation co-promoter; said co-promoter metals being the same as those listed as promoters per se hereinbefore. Two or more of the co-promoters may be present. The valence state of the metal cation does not appear to be significant.

Preferred co-promoter cation affording salts are cupric chloride, cupric fluoride, and cupric sulfate.

At least a co-promotional amount of the defined co-promoter metal cation is present in solution in the ferrous chloride solution charged to the oxidation reaction, in addition to an oxidation-promotional amount of ammonium ions.

Hereafter the finite range amount of metal co-promoter compound dissolved in the charge solution is given for cupric chloride as the co-promoter compound. It is a simple matter to convert these finite range amounts over to the particular defined metal co-promoter compound actually used.

In general, the dissolved cupric chloride co-promoter is present in an amount of not more than about 20 weight parts per 100 weight parts of charge solution. More commonly, the usage of $CuCl_2$ co-promoter is between about 0.1 and about 6 weight parts per 100 parts by weight of charge solution. More typically, the cupric chloride and the other metal ion co-promoters will be used in a smaller amount than the amount of ammonium ion present. For example: 3 wt. percent of ammonium chloride and 1 wt. percent of cupric chloride, both based on 100 weight parts of charge solution, give excellent results with WPL charge solution.

Oxidation process temperature and pressure conditions (A) When promoter is present: Hereinafter the term "dissolved promoter ions" is intended to cover any one of the hereinbefore defined promoters used alone or any of the dual promotional combinations set out before between dissolved ammonium ions and the defined metal copromoter ions.

In the oxidation process of the invention, the defined liquid aqueous ferrous chloride solution, containing at least an oxidation-promotional amount of dissolved promoter ions is intimately intermingled with free oxygen, at an elevated temperature for a time sufficient to obtain a liquid aqueous solution containing dissolved ferric chloride and dissolved promoter ions.

It is emphasized that the oxidation process of the invention begins with a liquid aqueous solution of ferrous chloride, containing a defined amount of defined dissolved promoter ions, continues as a liquid reaction medium(solution) during the oxidation reaction time, and ends with a liquid aqueous solution product containing dissolved ferric chloride and dissolved promoter ions—ferrous chloride may be present in the product solution from a slight amount up to a substantial amount, dependent on the conditions used in the oxidation reaction system. Therefore, it is necessary to maintain pressure in the oxidation reaction zone high enough to ensure that a liquid aqueous solution phase exists therein, throughout the time that the oxidation is being carried on. Because ferric oxide is produced as a byproduct of the ferrous ion oxidation, concentrated solutions may be more or less in a slurry condition, owing to the insoluble iron oxide particles present in the oxidation zone.

It has been discovered that a definite relationship exists between the temperature at which the reaction is carried out, the pressure maintained on the oxidation reaction zone, and the rate of oxidation of the dissolved ferrous ions to dissolved ferric ions. At each temperature, increasing the pressure in the reaction zone results in an increase in the rate of oxidation of the ferrous ions. On the other hand each pressure has associated with it a particular temperature which affords a maximum rate of oxidation of the ferrous ions.

The oxidation reaction is exothermic. With more concentrated charge solution, and selection of the temperature at which the charge solution is introduced into the reaction zone, it is possible to maintain and/or attain the desired oxidation temperature, without the use of additional heating means within the oxidation zone. A preferred mode of operation of the oxidation zone is to maintain the temperature substantially constant in the oxidation zone by taking overhead a water vapor stream; this allows another benefit in that the liquid aqueous ferric chloride product solution is of a higher concentration than the liquid aqueous ferrous chloride solution charged. However, it is essential that sufficient liquid water remain in the oxidation reaction zone to dissolve all the ferric chloride produced.

Temperature has a favorable effect on the oxidation rate; therefore the oxidation reaction is carried out at an elevated temperature, i.e., well above ordinary atmospheric ambient temperatures, and desirably above about 120° F. Because hot ferric chloride solution is extremely corrosive, the upper temperature is limited by the material of construction rather than by process limitation.

In general the promoted oxidation reaction is carried out at an elevated temperature, usually between about 120° and about 500° F. A more practical range of temperatures is between about 175° and about 400° F. (In the range of 400–500° F. Teflon lined steel vessels can be used as oxidation reactors; also some types of graphitic materials.) A preferred range of oxidation temperatures is between about 200° and about 350° F. (350° F. is about the practical upper limit for glass lined steel vessels).

At some temperatures and charge solution concentrations, sub-atmospheric pressures (vacuum operation) could be used; however, under these conditions even the promoted oxidation rate is undesirably low. A reasonable combination of temperature and oxidation rate is obtainable at atmospheric pressure. Because of the greatly increased oxidation rate, higher superatmospheric pressure operation is preferred.

It has been observed that starting with 40% ferrous chloride solution, using a moderate amount of promoter, venting about 20 vol. percent of the water as vapor, very rapid oxidation takes place at a temperature of about 300° F. and at a pressure of 100 p.s.i.g. (pounds per square inch gauge).

The oxidation may be carried out at substantially constant temperature or, preferably the temperature may be increased over the oxidation time. In general, the over all oxidation rate at constant pressure is obtained by the combination of decreasing the volume of liquid solution in the oxidation reactor by removal of at least some of the water vapor formed and the gradual increase in the temperature of the oxidation reactor contents.

At atmospheric pressure operation, for example, in the oxidation of WPL it is preferred to start the oxidation with the WPL charge solution at about 150° F. and to raise the temperature as the volume of liquid in the reactor decreases. When the reactor contents have been decreased to about one-half the original volume, the temperature has been increased to 180–190° F. This temperature range affords about the maximum rate at atmospheric pressure in the oxidation reactor. It has been observed that increasing temperature to 200° F. results in a significant decrease in the ferrous ion oxidation rate.

The oxidation reaction produces a liquid aqueous solution containing dissolved ferric chloride and dissolved promoter ions. A minor amount of dissolved ferrous chloride will usually be present in the product solution. In some embodiments a large amount of ferrous chloride will be present in the product solution. In addition to the liquid solution, iron oxide byproduct of the oxidation reaction will be present.

(B) When "No Promoter" is present: It has been discovered that ferrous chloride in aqueous solution can be converted to ferric chloride in high conversion by intimate intermingling with free oxygen, in the absence of oxidation promoter compound or added HCl. The "No Promoter Present" process of this invention operates in the same manner as the "Promoted Process" except that the "No Promoter Present" process must operate at (1) superatmospheric pressure and (2) at a higher minimum elevated temperature of at least about 175° F.

At a given temperature, even a small increment of pressure above atmospheric (zero p.s.i.g.) gives some benefit on oxidation rate. To obtain a more practical rate, it is desirable to operate the oxidation zone at a pressure of at least about 30 p.s.i.g. and preferably at a pressure of at least about 100 p.s.i.g.

In order to maintain a reasonably practical oxidation rate, it is desirable to operate the oxidation zone at a temperature of between about 175° and about 500° F. Preferably the oxidation is carried out at a temperature of between about 300° and 400° F. As in the "Promoted Process," the upper temperature will be determined by equipment limitations as is set out in the section devoted to operational conditions of the "Promoted Process."

Especially preferred for WPL oxidation is a combination of pressure in the range of about 100–200 p.s.i.g. and temperature in the range of about 300–400° F.

It is to be understood that faster oxidation rates can be obtained by the presence of promoters in the name "No Promoter Present Process." These may be any of those named hereinbefore or any other compound effective as an oxidation promoter for the ferrous ion to ferric ion oxidation in aqueous solution.

Effect of temperature on iron oxide byproduct quality

It has been observed that at the oxidation temperatures below about 300° F., the iron oxide byproduct of the ferrous chloride-oxygen reaction is a brick-red colored very finely divided material; even after prolonged gravity settling, the settlings occupy a voluminous space for their weight; the red oxide settles at a very slow rate on gravity settling; even after some days of settling, the supernatant liquid above the red oxide settlings retains a red-muddy opaque appearance.

When the oxidation is carried out at about 300° F. or higher, a remarkable transformation takes place in the characteristics of the iron oxide byproduct. The iron oxide is now a purplish-black color; the particles are much coarser grain size than the red oxide; the black oxide grains settle very rapidly and, importantly, the supernatant liquid is almost transparently clear; also, importantly, the black oxide settlings occupy only about 25–30% of the volume occupied by the same weight of red oxide settlings.

The quality of the supernatant liquid and the speed of settling is so fast that decanting is the preferred method of separating the black oxide whereas filtration is the preferred method of separating the red oxide.

Improving ferric chloride solution purity

In product liquid solutions containing larger amounts of dissolved ferrous chloride, the solution purity with respect to ferrous chloride can be improved by cooling the hot solution from the oxidation reactor to a temperature at which ferrous chloride preferentially precipitates out of solution; the insoluble—at this lower temperature— ferrous chloride is filtered off and can be recycled to the oxidation reaction; usually this ferrous chloride is used to fortify charge solution to the oxidation reaction.

Preferred embodiments of the oxidation process: The preferred charge solution to the oxidation process of the invention is waste HCl pickle liquor (WPL) and the preferred embodiments of the oxidation process are directed to this particular charge solution. WPL containing for example about 22% of ferrous chloride and some free HCl is treated with finely divided iron oxide particles in an amount sufficient to convert the HCl content to iron chloride and to afford a minor amount of finely divided iron oxide particles dispersed in the treated WPL. Water is then evaporated from the treated WPL to obtain a concentrated liquor containing about 40% of ferrous chloride and having a temperature of about 220° F. The particular promoter is added to the hot concentrated liquor and the solution of promoter in the liquor is passed to an oxidation reactor provided with means for sparging air and also mechanical agitating means to afford an intimate intermingling of the solution liquor and the air. The pressure on the oxidation reactor is held at about 100 p.s.i.g. and a water vapor stream withdrawn at a rate such that the temperature in the reactor rises to about 300° F.; then the temperature is held at this point for the remainder of the oxidation reaction. The ferrous chloride is converted to ferric chloride and ferric oxide, according to the reaction:

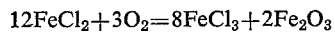

$$12FeCl_2 + 3O_2 = 8FeCl_3 + 2Fe_2O_3$$

The ferric chloride product is present as liquid aqueous ferric chloride solution which also contains the promotor. The product solution also contains some dissolved unconverted ferrous chloride which may in some cases be a large amount, as well as the insoulble iron oxide dispersed therein. The iron oxide is filtered or decanted away from the clarified solution. Clarified product solution containing a large amount of ferrous chloride may be cooled to ambient temperature to cause a precipitation of ferrous chloride solid; this is separated to obtain a purer product solution of ferric chloride.

Embodiment A: Using ammonium chloride as the promoter in an amount of about 3 parts by weight per 100 parts by weight of hot concentrated liquor, 1 hour of oxidation time gives a product solution containing a major proportion of the iron ions present in the form of ferric ions, i.e., ferric chloride.

Embodiment B: Using a dual promoter system of about 3 parts of ammonium chloride and about 1 part of cupric chloride, each per 100 parts of concentrated liquor and 1 hour oxidation time, there is obtained a solution containing on the order of 98% of the dissolved iron ions in the ferric ion form.

Embodiment C: Using cupric chloride promoter in an amount of about 3 parts by weight per 100 weight parts of concentrated liquor, 1 hour oxidation time gives a product solution containing much more than a major proportion of the iron ions therein in the form of ferric ions, i.e., ferric chloride, about 85% ferric ion.

Embodiments with no promoter present

Embodiment D: This embodiment is similar to A–C except that the temperature is about 350° F. and the pressure is about 150 p.s.i.g. and no promoter is present in the charge solution in the oxidation zone. In about 15 minutes time, a major proportion of the iron ions in the solution are in the ferric ion form.

Embodiment E: This embodiment is closer to A–C except that the pressure is about 100 p.s.i.g. (300° F.) and no promoter is present. In about 30 minutes time much more than a major proportion of the iron ions in solution are in the ferric ion form, about 89% ferric ion.

The ferric chloride decomposition process

An aqueous solution of ferric chloride at temperatures above about 250° F. decomposes the ferric chloride, forming ferric oxide and HCl gas. The HCl gas and water vapor are withdrawn from the decomposer and condensed to obtain hydrochloric acid. Enough water must be present in the decomposer to convert essentially all the ferric chloride; it is possible to control the acid concentration by controlling the amount of water present. Hydrochloric acid containing 30–33% HCl, and even higher amounts, can be readily produced.

In general, the upper limit of temperature used in the decomposition reaction is about 400° F. When making the high concentration acid product and operating the decomposer at about atmospheric pressure, the preferred decomposition temperature is about 360–370° F.

It has been discovered that the temperature needed for rapid decomposition of the aqueous ferric chloride solution is remarkably decreased when the decomposition is carried out at sub-atmospheric pressure, i.e., in vacuo. The lower the pressure, the lower the temperature needed. For example, at a vacuum of 27–28 inches of mercury, rapid and complete decomposition takes place at 250–260° F. These results are comparable to operating about 100° F. higher at atmospheric pressure.

It has further been discovered that the benefits of direct vacuum operation are obtained by the stripping effect of introducing hot combustion gases, i.e., hot inert gas, into the aqueous solution in the decomposer. It is preferred to have the inert gas introduced into the decomposing solution to provide the heat needed to maintain the decomposition reaction, thus eliminating the need for indirect heaters and consequent corrosion problems. Hot submerged combustion gases provided from a submerged combustion burner are the preferred source of the hot inert gas; under these conditions decomposition takes place readily and essentially completely at a temperature on the order of 250° F.

When the hot submerged combustion gas heating procedure is used, the HCl produced comes off accompanied not only by water vapor but also by non-condensible gases formed in the combustion operation. It is necessary to scrub the HCl out of this dilute stream with water; therefore a lower concentration hydrochloric acid product is obtained than can be obtained by the decomposition procedures involving indirect heating of the ferric chloride solution. The about 20% azeotropic acid is easily made. Higher concentrations can be made by control of the decomposition operation and, especially, by control of the water scrubbing operation, if this is used. These concentrations are high enough for either makeup or direct use in steel picklers.

It has been observed that better control of the decomposer operation is possible when a fairly clean aqueous ferric chloride solution is charged; desirably the solution is low in iron oxide solids and low in dissolved ferrous chloride content.

Although the decomposer can be run to a dry solids content condition, it is preferred to control the decomposition operation so that the decomposer bottoms is an aqueous slurry of iron oxide (and if used dissolved promoter, or even solid promoter).

When recovering hydrochloric acid from WPL charge to oxidation, it is preferred to decompose using hot submerged combustion gases and a temperature of on the order of 250° F.

Preferred embodiment of recovering hydrochloric acid from waste HCl pickel liquor: WPL containing about 22% of dissolved ferrous chloride and some free HCl is admixed with finely divided iron oxide particles in an amount sufficient to react with the free HCl. When makeup ammonium chloride promoter is needed, ammonia gas ($NH_3$) is admixed with the WPL before iron oxide is admixed therewith. In some instances all the HCl is reacted with ammonia. The treated WPL is concentrated in an evaporator; enough water is removed to produce a concentrated treated waste HCl pickle liquor containing about 40% of dissolved ferrous chloride. The evaporation produces a hot liquor at about 220° F.

The hot ferrous chloride liquor is used to extract the aqueous slurry bottoms product from the aqueous ferric chloride solution decomposer. The extraction operation picks up the promoter dissolved and suspended in the decomposer bottoms, the ferrous chloride and any residual ferric chloride present; a minor amount of the finely divided iron oxide produced in the decomposer is also picked which provides the finely divided iron oxide particles desired to be present in the oxidation reactor at the beginning of the oxidation reaction. If desired, the entire decomposer bottoms product may be mixed with the hot concentrated ferrous chloride liquor since the iron oxide does not interfere with the oxidation reaction.

The hot concentrated liquor at 220° F. and the decomposer bottoms also at about that temperature are passed to an oxidizer vessel, which is preferably a glass lined vessel provided with an air inlet sparger and mechanical agitation to provide intimate (vigorous) agitation in the oxidizer. The hot concentrated liquor contains about 3 parts by weight of ammonium chloride promoter and about 1 part by weight of cupric chloride co-promoter, each per 100 parts by weight of hot concentrated liquor. A pressure valve maintains a pressure on the oxidizer contents of about 100 p.s.i.g.; the oxidizer contents are permitted to rise to a temperature of about 300° F. and this temperature is maintained by taking off a water vapor stream.

In about 1 hour, the oxidizer contains iron oxide from the ferrous ion to ferric ion conversion and a liquid aqueous solution of ferric chloride and dissolved ammonium and cupric ions. Under these conditions, on the order of 98% of the ferrous ion is converted to ferric ion.

The total material present in the oxidizer is passed to a filter where the iron oxide particles are removed. The retained iron oxide is water washed to recover occluded ferric chloride solution. Some of this iron oxide is used to neutralize the free HCl content of the WPL charge solution.

The aqueous ferric chloride solution, including dissolved unconverted ferrous chloride and promoter, and the wash water are passed to a ferric chloride decomposer vessel. Conditions in the filtration operation are adjusted so that the charge to the decomposer is at about the desired decomposition temperature of on the order of 250° F.; the decomposer is maintained at the desired temperature and stripping condition by means of a submerged combustion burner, fired with natural gas and air.

It is convenient to continuously withdraw a slurry stream from the decomposer and pass this through a cone bottomed decanter vessel. The decanter produces a decomposer bottoms product as an aqueous slurry of iron oxide and dissolved ammonium and cupric ions. It is this aqueous slurry which is admixed with the hot concentrated liquor produced by the evaporator. The separated solution is recycled to the oxidizer.

There is continuously withdrawn overhead from the decomposer a stream containing HCl gas, water vapor, nitrogen, carbon dioxide, oxygen, and other combustion gases. The water vapor stream produced in the oxidizer is combined with the decomposer overhead stream and then passed to an adiabatic absorber. In the absorber, a liquid water stream absorbs the HCl gas. Nitrogen and other gases and water vapor are passed out of the absorber. A bottoms product of hydrochloric acid is withdrawn from the absorber; in this case there is produced the azeotropic acid containing about 20% HCl.

The above description shows that except for the small losses inevitable in commercial scale operation all the chlorine content of the WPL charged to the process is recovered as hydrochloric acid, suitable for use in a pickling operation. The iron oxide recovered is essentially pure and is useable in steel making; the promoter system is recycled. The only important environmental pollutant produced by the process of the invention is carbon dioxide, from the decomposer, and this pollutant can be tolerated.

EXAMPLES

Example I: Oxidation of liquid aqueous ferrous chloride solution at atmospheric pressure: promoter and no promoter A number of standard solutions was prepared; each standard solution consisted of 270 g. of ferrous chloride tetrahydrate, reagent grade, and 441 g. of distilled water. The oxidizer vessel was a 1 liter, open top beaker provided with a thermometer, a mechanical propellor stirrer, and an air injection tube.

Each test in this example was carried out at 175° F. and the ferrous chloride solution was brought to this temperature before promoter, if any was used, was added to the ferrous chloride solution. Air was injected and the stirrer operated to afford very vigorous agitation of the beaker contents. The oxidation of the ferrous ion in the solution was followed hourly; a small sample of the beaker contents was removed; the solid content filtered of; the filtrate was diluted with distilled water and then titrated according to standard procedures for ferrous ion and ferric ion, separately. The results of each sample were obtained in terms of dissolved ferric ion as a percent of both the dissolved ferrous ion and the dissolved ferric ion. (The solids byproduct is essentially ferric oxide.)

Test A: Only the standard solution was charged to the oxidizer.

Test B: The standard solution plus 1.7 g. of ammonium chloride, dissolved therein (0.24 wt. percent based on standard solution) were charged to the oxidizer.

Test C: The standard solution plus 1.7 g. of ammonium chloride (0.24 wt. percent based on standard solution) plus 1.7 g. of cupric chloride dihydrate (0.19 wt. percent of $CuCl_2$ based on standard solution), dissolved therein, were charged to the oxidizer.

Test D: The standard solution plus 78 g. of ammonium chloride (11 wt. percent based on standard solution) plus 10 g. of cupric chloride dihydrate (1.1 wt. percent of $CuCl_2$ based on standard solution were charged to the oxidizer.

Each of the above defined liquid charge solutions was oxidized for a time of 5 hours. The 5th hourly analysis of the liquid product solution showed, where "percent ferric ion" means the percent of ferric ion found in the solution based on the total of dissolved ferric and ferrous ion found in the analysis:

Test: Percent ferric ion
- A (no promoter present) _____ 18
- B ($NH_4Cl$ present) _____ 29
- C ($NH_4$ and $CuCl_2$ present) _____ 42
- D ($NH_4Cl$ and $CuCl_2$ present) _____ 76

Test E: The oxidation of the contents of Test D was continued for a total of 9 (nine) hours; analysis of the oxidizer solution contents found the "percent ferric ion" to be 86.

It was observed that in each of the tests of this example that at 5 hours oxidation time, about one-quarter of the volume of liquid present at the start of the test had been evaporated.

Comments: Test B above shows that ammonium ions dissolved in the ferrous chloride solution, without other promoter, are effective oxidation promoters in this liquid system even when present in minor amount.

Test C shows the benefit obtained when using a dual promoter dissolved in the ferrous chloride solution, each being present in a minor amount.

Test D shows the beneficial effect on oxidation rate when using a dual promoter and greatly increasing the amount of both the ammonium chloride promoter and cupric chloride co-promoter. It is pointed out that in Test C, roughly equal amounts of the two promoters were present; whereas in Test D the $NH_4Cl/CuCl_2$ weight ratio was 10/1.

Test E shows the beneficial effect of increasing time on the amount of the dissolved iron ions in the product solution which are in the desired ferric ion form. These are present as dissolved ferric chloride.

Example II: Oxidation of liquid waste HCl pickle liquor at atmospheric pressure: promoter and no promoter Steel mill waste HCl pickle liquor containing 24.2 wt. percent of ferrous chloride was used as the standard solution in the tests of this example. The test equipment and procedure was as is described in Example I.

Test IIA: In this test, only the WPL was charged to oxidizer—no promoter added.

Test IIB: The WPL standard solution plus 1 wt. percent of ammonium chloride, based on the WPL, dissolved therein were charged to the oxidizer.

Test IIC: The standard WPL solution plus 1 wt. percent of ammonium chloride dissolved therein plus 1 wt. percent of cupric chloride dihydrate (0.8 wt. percent of $CuCl_2$) dissolved therein, each promoter based on WPL, were charged to the oxidizer.

Test IID: Test IID differed from the A–C in that it was necessary to add distilled water to the WPL in order to dissolve the large amount of ammonium chloride desired to be used. The test was carried using 711 g. of WPL, enough added distilled to just cause solution of the solid ammonium chloride added. On the order of 75 g. of water was added. About 55 wt. percent of ammonium chloride was present and about 5.5 wt. percent of cupric chloride dihydrate (about 4.4 wt. percent of $CuCl_2$ was present in the oxidizer charge solution.

Tests A–C above were carried on for 5 hours. Test D was carried on for a total of 8 hours; results on "percent ferric ion" are reported for 5, 6 and 8 hours. The results of the tests are shown:

| Test | Promoter | Percent ferric ion |
|---|---|---|
| A (5 hours) | None | 15 |
| B (5 hours) | $NH_4Cl$ | 18 |
| C (5 hours) | $NH_4Cl+CuCl_2$ | 25 |
| D (5 hours) | do | 76 |
| D (6 hours) | do | 86 |
| D (8 hours) | do | 94 |

Comments: The above tests show that the promoter and dual promoter system are effective for oxidation of ferrous ion in WPL pretty much as in pure ferrous chloride aqueous solution.

It was observed by the appearance of the oxidizer contents that a significant time elapsed (induction period) after air injection and agitation was begun before a significant oxidation rate was reached. Only a small delay was noticed using the pure charge solution of Example I.

Example III: Dual promoter oxidation of liquid waste HCl pickle liquor at atmospheric pressure This example was carried out using the equipment and procedure of Example I using as the liquid ferrous chloride solution, the WPL described in Example II, observe dual promoter systems other than the $NH_4Cl$-$CuCl_2$ system shown in Examples I and II.

The charge to the odidizer in each test of this example consisted of standard WPL solution plus 1 wt. percent of ammonium chloride dissolved therein plus 1 wt. percent of a soluble co-promoter. Each test was carried on for 5 hours; the co-promoter for each test and the 5 hour "percent ferric ion" are shown:

| Test | Co-promoter | Percent ferric ion |
|---|---|---|
| IIIA | Cobalt chloride ($CoCl_2$) | 20 |
| IIIB | Nickel chloride ($NiCl_2$) | 20 |
| IIIC | Manganese sulfate ($MnSO_4$) | 22 |
| IIID | Chromium sulfate ($Cr_2(SO_4)_3+9H_2O$) | 23 |
| IIIE | Zinc chloride ($ZnCl_2$) | 22 |

In addition to the above effective co-promoters, other tests not carried out as in this example, demonstrate that other effective water soluble inorganic salts are: cupric fluoride, cupric sulfate, manganese chloride ($MnCl_2$), and chromic chloride ($CrCl_3$).

Example IV: Oxidation of WPL at atmospheric pressure: no promoter

This example was carried out using the equipment and procedure of Example I. The charge solution in each test was 700 ml. of WPL containing 22% of ferrous chloride. No promoter was present in the WPL in this example. Each test was carried out at atmospheric pressure. The results of each test are set out below:

| | Percent ferric ion | |
|---|---|---|
| Time in hours | Test A: 180° F. | Test B: 200° F. |
| 1 | 8 | |
| 3 | 19 | 18 |
| 5 | 26 | 29 |
| 9 | 42 | 48 |
| 11 | 48 | 53 |
| 17 | 59 | 63 |
| 27 | 70 | 75 |
| 35 | 72 | 78 |
| 37 | 73 | 79 |
| 39 | 73 | |
| 41 | 73 | 80 |

Comment: The above results indicate that very long oxidation times without promoter at atmospheric pressure can produce solutions containing large amounts of ferric ion in solution. The higher temperature did not produce rate benefits until after 5 hours but did result in a higher "equilibrium" condition of the product solution.

Example V: Oxidation of concentrated WPL at superatmospheric pressure: no promoter This example was carried out using the equipment and procedure of Example I, except that the equipment was enclosed in a pressure vessel and 200 ml. of water was added to the oxidizer at 1.5 hours and again at 2.5 hours. The charge solution was 22% WPL which had been evaporated to a concentration of about 40% ferrous chloride; in each test 1400 ml. of 40% solution was charged to the oxidizer. No promoter was used in any test of this example. The results of Tests A and B were:

| Time in hours | Percent ferric ion | |
|---|---|---|
| | Test A: 200° F., 15 p.s.i.g. | Test B: 200° F., 30 p.s.i.g. |
| 0.5 | 3 | 7 |
| 1 | 6 | 10 |
| 1.5 | 7 | 14 |
| 2 | 9 | 18 |
| 2.5 | 12 | 20 |
| 3 | 15 | 25 |
| 4 | 22 | 34 |
| 5 | 28 | 39 |

Test C: 300° F., 100 p.s.i.g.: Using these more drastic conditions, at 1 hour time, the percent ferric ion was 62%.

Test D: 300° F., 150 p.s.i.g.: The 50 pound pressure increase over "C" resulted in a percent ferric ion of 36% at 10 minutes time and 89% at 0.5 hour (30 minutes) time.

Test E: 350° F., 150 p.s.i.g.: The 50° F. increase in temperature over "D" resulted in a percent ferric ion of 63% in 15 minutes time.

Comment: Tests A and B of this example cannot be compared directly with Test B of Example IV. Because of the different "WPL" solutions used, there was present in Example V, about four times as many ferrous ions in the total charge solution as was present in Example IV (1400 ml. of 40% solution in V; 700 ml. of 22% solution in IV). The air injection rates in both examples were closely the same. It is concluded that the super-atmospheric pressure operation does indeed give a very large improvement in rate of oxidation.

Tests C and D show conclusively the benefits of increasing pressure at a constant temperature of oxidation.

Tests D and E show that an oxidation rate benefit is obtained by increasing temperature even at a relatively high superatmospheric pressure.

Example VI: Oxidation of concentrated WPL at superatmospheric pressure with certain promoters present The equipment used in these tests was the same as in Example V. 1400 ml. of about 40% concentrated WPL, as in Example V, was charged in each test. In some tests only one promoter compound was present in the solution being oxidized. In some tests a dual promoter system was present in the solution being oxidized. The cupric chloride was charged as the dihydrate; the chromic sulfate was charged as a mixed hydrate having about 9 water molecules. All the tests were at 300° F. and at 100 p.s.i.g. The amount of promoter compound is given as weight percent based on weight of 40% WPL charged. The results of these tests were:

| Test | Time, hours | Promoter | Percent ferric ion |
|---|---|---|---|
| A | 1 | 3% NH$_4$Cl | 68 |
| B | 1 | 3% CuCl$_2$ | 85 |
| C | 1 | 1.5% NH$_4$Cl plus 1.5% CuCl$_2$ | 92 |
| D | 1 | 3% Cr$_2$(SO$_4$)$_3$ | 82 |
| E | 2 | 3% Cr$_2$(SO$_4$)$_3$ | 99 |
| F | 1 | 1.5% CuCl$_2$ plus 1.5% Cr$_2$(SO$_4$)$_3$ | 86 |

Comment: These tests show that at these conditions cupric ion alone or chromic ion alone is a better promoter than ammonium ion alone. Test F indicates no significant benefit for using a mixture of the two metal ions. However, Test C shows a large benefit is obtained by using the combination of ammonium ion and metal ion, i.e., cupric, over either ion used alone.

It has been found that a dual promoter system of 3% NH$_4$+1% CuCl$_2$ at the above conditions gave a percent ferric ion of 99%, i.e., essentially complete conversion of ferrous ion. Because of cost and the use of NH$_3$ for makeup, the ammonium compound is the preferred larger component of the dual promoter system.

Example VII: Dual promoter oxidation of WPL at atmospheric pressure

This example was carried out using the equipment of Example I. 700 ml. of WPL containing 22% of ferrous chloridew as charged in the test. The dual promoter system consisted of 3 wt. percent of NH$_4$Cl+1 wt. percent of CuCl$_2$, based on WPL. The oxidation temperature was 180° F. and the pressure was atmospheric. The results of the test were:

| Hours: | Percent ferric ion |
|---|---|
| 1 | 11 |
| 3 | 25 |
| 5 | 44 |
| 7 | 62 |
| 9 | 70 |
| 15 | 82 |
| 21 | 86 |
| 25 | 89 |
| 35 | 90 |
| 37 | 90 |

Comment: This example and following Example VIII demonstrate that superatmospheric operation is equally beneficial for both the promoted oxidation operation as for the no promoter operation.

Example VIII: Dual promoter oxidation of liquid waste HCl pickle liquor at super-atmospheric pressure The example was carried out using the equipment and procedure of Example I, except that the equipment was enclosed in a pressure vessel. The charge to the test, in each, was 700 g. of waste HCl pickle liquor containing 24.2 wt. percent of ferrous chloride and a trace amount of ferric chloride. In each test, there was dissolved in the WPL, 3 wt. percent of ammonium chloride and 1 wt. percent of cupric chloride dihydrate (0.8 wt. percent of CuCl$_2$), each based on WPL. The "percent ferric ion" present in the product solution was determined at different combinations of time, super-atmospheric pressure (p.s.i.g.) and temperature (° F.). The results of the tests of this example are:

| Test | Hours | ° F. | p.s.i.g. | Percent ferric ion |
|---|---|---|---|---|
| A | 3 | 180 | 45 | 86 |
| B | 1 | 180 | 100 | 66 |
| | 2 | 180 | 100 | 96 |
| | 2.3 | 180 | 100 | 97 |
| C [1] | 0.75 | 300 | 100 | 75 |
| | 1.0 | 300 | 100 | 98+ |

[1] Test C differed from Tests A and B in that 10 g. of finely divided ferric oxide was added to the charge to the reactor at the start of the Test C.

Comments: Tests A and B above show the beneficial effect on oxidation rate of increasing pressure at constant temperature. Tests B and C above show the beneficial effect of increasing temperature at constant super-atmospheric pressure. (The 98+ shows that within the error of the determination at this ion content, essentially all of the ferrous chloride present in the WPL has been oxidized to ferric ion in the form of dissolved ferric chloride and as insoluble ferric oxide.)

Example IX: Dual promoter oxidation of concentrated WPL at superatmospheric: effect of temperature In each of the tests of this example, 1400 ml. of the 40% concentrated WPL was charged to oxidation. The dual promoter system consisted at 3 wt. percent of NH$_4$Cl plus wt. percent of CuCl$_2$, based on 40% WPL. Each test was carried out at 150 p.s.i.g. pressure.

Test A.—Temp.: 300° F.; Time: 30 minutes; percent ferric ion: 99%.

Test B.—Temp.: 350° F.; Time: 15 minutes; percent ferric ion: 93%.

Comment: A comparison of the No Promoter Example V and the above results demonstrates a distinct benefit is obtained even at these severe conditions by the use of promoter during the oxidation.

Example X: Effect of iron oxide particle addition on the rate of promoted oxidation of WPL These tests were carried out according to the procedure of Example II using a dual promoter system consisting of 1 wt. percent of $NH_4Cl$ plus 0.8 wt. percent of $CuCl_2$, based on WPL charged. The temperature was 175° F. and the pressure was atmospheric. In Test A below the oxidation was carried out without change from Example II. In Test B below a minor amount of finely divided iron oxide particles was added to the WPL before air injection was begun. The results of the tests were:

| Time in hours | Percent ferric ion | | |
|---|---|---|---|
| | Test A (no particles) | Test B (added particles) | B-A |
| 1 | 5 | 11 | 6 |
| 2 | 7 | 17 | 10 |
| 3 | 11 | 22 | 11 |
| 4 | 19 | 27 | 9 |
| 5 | 27 | 33 | 6 |

It was observed that, whereas the "no iron oxide particles" Test A showed only the expected agitated appearance of the oxidizer contents during the early part of the test, in Test B the iron oxide particles attracted the air and became encased in an air bubble. The number of such brilliant bubbles was so great that the oxidizer contents became almost opaque; and almost immediately the production of iron oxide byproduct coloration became evident. In tests using no added iron oxide, there is always some delay before the oxidation is clearly underway. "B-A" above shows that after 3 hours, the percent ferric ion in the two tests were coming toward each other.

Example XI: Oxidation of WPL at superatmospheric pressure with recycle of dual promoter This example was carried out using the equipment and procedure of Example I, except that the equipment was enclosed in a pressure vessel. The charge solution to oxidation in each test was 700 g. of 24.2% WPL.

The dual promoter "recycle" was obtained as follows: WPL was oxidized as in Example VIII using a 3 wt. percent of dissolved $NH_4Cl$ and 1 wt. percent of $CuCl_2$, 1 hour oxidation time, 300° F. temperature, and 100 p.s.i.g. to obtain a percent ferric ion content of 98% in the product solution. This solution was freed of iron oxide byproduct and decomposed to HCl gas and an aqueous slurry of ferric oxide; the liquid portion of the slurry contained ammonium chloride, cupric chloride and ferric chloride.

The WPL charge to this example was contacted with the decomposer slurry in order to extract therefrom the ammonium chloride, cupric chloride containing liquid.

The WPL containing the extracted dual promoter was carried out at the above set forth conditions. The product solution of this first oxidation, now designated Test A, had a percent ferric ion content of 98%.

Test B: The product solution of Test A was then decomposed to produce aqueous slurry bottoms. These bottoms were then extracted with fresh WPL and the WPL-Extract solution was then oxidized as in Test A; the product solution of Test B contained 98% ferric ion.

Tests C, D, and E: The procedure of Test B was repeated three times to provide four complete cycles of oxidation, decomposition and extraction of dual promoter for reuse in the oxidation step. In each of these additional cycles, the percent ferric ion content obtained was 98%.

Comment: This example demonstrates that the dissolved promoter ions went through the oxidation and decomposition without change or significant loss; the percent ferric ion content of the oxidation product solution was the same in all cycles. Also the example demonstrates that the dissolved promoter ions can be easily recovered for reuse in the oxidation step. This recycle ability affords an economic WPL recovery process with respect to the amount of makeup promoter needed in commercial scale operation.

Example XII: Decomposition of aqueous ferric chloride solution at atmospheric pressure The decomposer vessel was a flask equipped with a mechanical stirrer, a water cooled condensor, and a receiver vessel. The test solution consisted of, on a weight basis, 32% ferric chloride, 4% ferrous chloride, and the remainder water.

500 ml. of test solution at room temperature was charged to the decomposer. The temperature of the contents of the decomposer raised. The overhead from the decomposer was condensed and collected. Periodically the condensate was tested for HCl content.

When the decomposer contents attained (a) a temperature of 280° F., an additional amount of 100 ml. of test solution was charged; (b) and when the contents reached 320° F., an additional 100 ml. of test solution was charged.

The condensate recovered showed little HCl content until the decomposer temperature reached about 340° F. then a sharp jump in HCl content of the condensate took place.

At a temperature of about 360–370° F., the condensate analyzed as 33% hydrochloric acid.

The decomposer was maintained at 360–370° F. and 250 ml. of test solution charged thereto. The condensate maintained the 33% hydrochloric acid composition.

The test was terminated when the mechanical stirrer being used began to have difficulty in agitating the accumulated slurry in the bottom of the decomposer flask.

Example XIII: Decomposition of aqueous ferric chloride solution at vacuum condition The apparatus of Example XII was modified by the addition of a vacuum pump and a small flask was placed beneath the decomposer and connected thereto by a pipeline; this small flask functioned as a ferric oxide slurry trap. The test solution filled the trap and the connecting line when solution was charged to the decomposer. The connecting line remained open during the entire test.

The text solution in this Example XIII was product solution prepared as in Example VIIIA; it had the dissolved iron ions as about 85% ferric ion form and about 15% ferrous form.

The vacuum pump was started and the test was conducted as in Example XII, except for temperature conditions. As the contents of the decomposer became more concentrated and the temperature increased and the vacuum increased, more test solution was added to maintain the liquid level in the decomposer.

When the temperature in the decomposer had increased to 260° F., the vacuum was at 27–28 inches of Hg, and the condensate had reached a 30% hydrochloric acid composition.

The ferric oxide and solids in the decomposer settled by way of the connecting pipeline into the trap flask.

The test could have been continued indefinitely by replacing the trap flask when it became full of precipitated solids and by adding test solution to the decomposer flask to maintain the liquid level therein, while making condensate of 30% hydrochloric acid composition.

Example XIV: Decomposition of aqueous ferric chloride solution using heating gases from a submerged combustion burner In this example the decomposer was a 4 liter beaker provided with a submerged combustion burner and a cover; the beaker was connected by way of a pipeline from the cover to the bottom of a packed absorption column. The column was provided with a water inlet at the top to permit passing down water countercurrent to the gases flowing upward in the column.

The liquid in the decomposer was circulated by a pump through a decanter vessel in which the solids content was settled out and held; the clarified liquid was returned to the decomposer.

In this example, the test solution consisted of aqueous 18 wt. percent ferric chloride solution. The submerged combustion burner was ignited and the test solution was introduced into the decomposer at a rate sufficient to maintain a constant volume in the decomposer.

The temperature in the decomposer gradually increased to 256° F. and then stabilized at this level. The aqueous solution emerging as absorption column bottoms corresponded to 17% hydrochloric acid. Solid ferric oxide gradually filled the decanter trap.

During the test the apparent pressure on the decomposer was at about atmospheric pressure, but the temperature and decomposition rate were pretty much the same as for the vacuum Example VIII.

This test could have been kept running indefinitely by replacing the decanter-trap when it became full of ferric oxide and continuously adding test solution to the decomposer.

Thus having described the invention, what is claimed is:

1. A process for producing hydrochloric acid from waste HCl pickle liquor, which process comprises:
   (I) intimately intermingling free oxygen and liquid aqueous solution selected from the class consisting of waste HCl pickle liquor and solution derived from waste HCl pickle liquor, said liquid aqueous solution containing not more than a small amount of free HCl, at superatomspheric pressure and at a temperature between about 175° and 500° F., in the absence of promoter ions, to obtain an aqueous solution containing dissolved ferric chloride; and
   (II) heating said ferric chloride solution at a temperature between about 250° and 400° F., while taking overhead a stream of water vapor and HCl gas, and obtaining in said ferric chloride decomposition zone an aqueous slurry of iron oxide.

2. The process of claim 1 wherein said superatmospheric pressure is at least about 30 p.s.i.g.

3. The process of claim 1 wherein the heating of II is carried out at subatmospheric pressure.

4. The process of claim 3 wherein the heating of II is obtained by means of hot submerged combustion gases and said temperature is on the order of 250° F.

5. The process of claim 1 wherein the aqueous ferric chloride solution produced in I is cooled to precipitate a solids phase; the solids are separated from the cooled aqueous ferric chloride solution; and the cooled separated aqueous ferric chloride solution is passed to II.

6. The process of claim 1 wherein in I said waste pickle liquor has been treated with finely divided iron oxide particles in an amount sufficient to convert the HCl content thereof to iron chloride and to afford a minor amount of finely divided iron oxide particles dispersed in said treated liquor.

7. The process of claim 6 wherein said treated liquor is then concentrated by evaporation of a substantial amount of water therefrom, prior to being charged to said oxidation zone, to obtain a solution derived from waste HCl pickle liquor.

References Cited

UNITED STATES PATENTS

| 2,428,221 | 9/1947 | Hudson | 23—154 X |
| 2,993,757 | 7/1961 | Dasher et al. | 23—154 X |
| 3,310,435 | 3/1967 | Robinson et al. | 23—154 X |
| 3,502,432 | 3/1970 | Phelps | 23—154 |

FOREIGN PATENTS

| 25,129 | 1968 | Japan | 23—154 |
| 6704696 | 10/1968 | Netherlands | 23—87 |

OSCAR R. VERTIZ, Primary Examiner

C. B. RODMAN, Assistant Examiner

U.S. Cl. X.R.

423—140